Sept. 6, 1927.
C. HYLAND
1,641,491
RHEOSTAT FOR LIQUID LEVEL INDICATORS
Filed Oct. 24, 1922
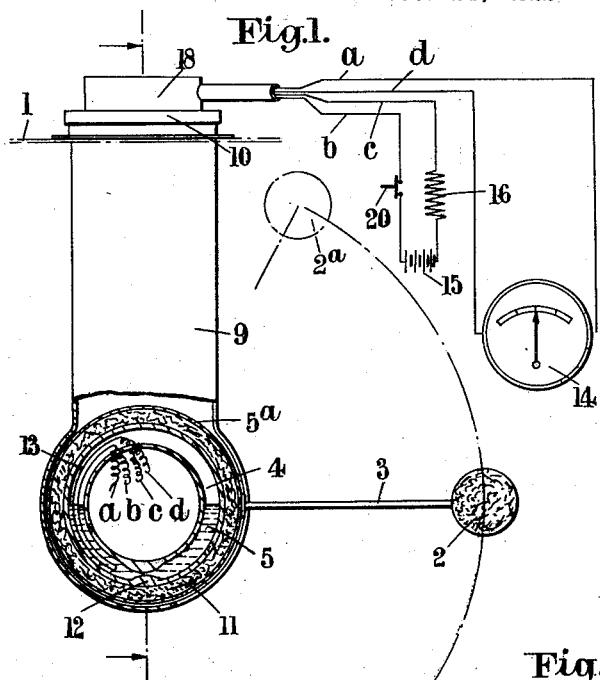
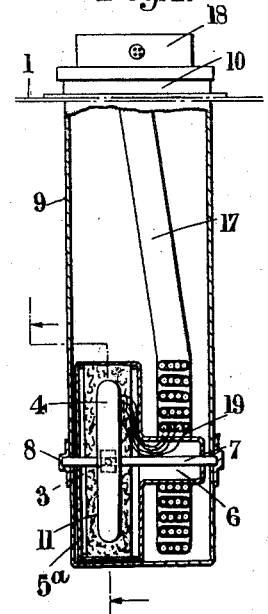
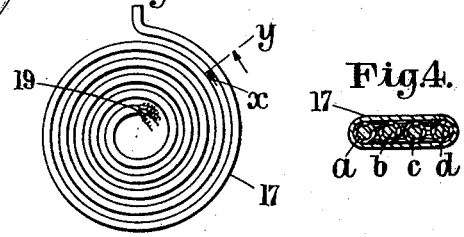
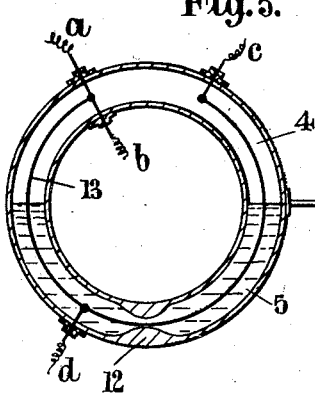
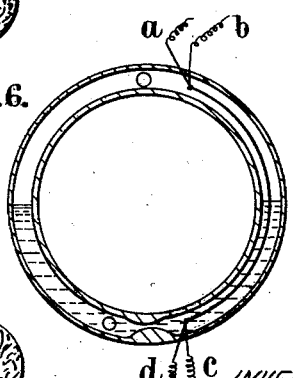
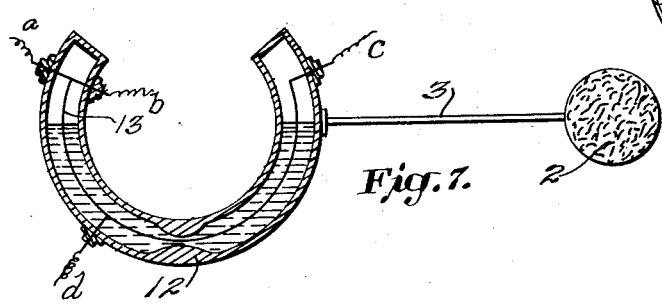
INVENTOR
Charles Hyland,
By B. Singer,
Atty.

Patented Sept. 6, 1927.

1,641,491

UNITED STATES PATENT OFFICE.

CHARLES HYLAND, OF LEEDS, ENGLAND.

RHEOSTAT FOR LIQUID-LEVEL INDICATORS.

Application filed October 24, 1922, Serial No. 596,619, and in Great Britain November 3, 1921.

This invention relates to instruments for indicating, and also if necessary recording, the level of fluid in a vessel, and it relates more particularly, but not exclusively to instruments for use in the petrol tanks of automobiles, the water tanks on ships, and like containers, which are subject to vibration, and/or irregular movement.

Hitherto apparatus has been used consisting of a float adapted to rise or fall with the surface of the liquid, which float directly operates the indicating and/or recording device. Such apparatus has disadvantages where the indication or record has to be made at a distance from the fluid containing vessel, or where it is desired that the indications be given whilst the vessel is subject to movement or vibration, as for example in the case of the petrol tank of any automobile, and it is a principal object of the present invention to provide an apparatus which will effect the indication or record at any required distance from the fluid containing vessel, and the accuracy of which will not be materially affected by any ordinary motion or vibration to which the said vessel may be subjected.

With these and other objects in view, I provide within the fluid containing vessel a float at one end of an arm, to the other end of which is rigidly fixed a body adapted to undergo rotary movement about a horizontal axis, according to the movement of the float, whereby the electrical resistance of a circuit of which a movable conductor within said body is adapted to form a part, is varied, thus enabling the position of the float within the fluid containing vessel to be indicated and/or recorded on a galvanometer or like electrical indicating and/or recording device. The indicating or recording device may be arranged in any suitable place, such as for example, on the dashboard of an automobile. The invention also comprises the provision of means for reducing to a minimum inaccuracies in the indicator readings, due to vibrations or other movements of the fluid containing vessel.

The invention in a preferred form, is carried out as follows, and is illustrated in the accompanying drawings, in which:—

Fig. 1 is a partly diagrammatic part sectional elevation of an apparatus according to one method of carrying out my invention.

Fig. 2 is a part sectional view at right angles to that of Fig. 1.

Fig. 3 is a side view of the conductor carrier hereinafter described.

Fig. 4 is a section through the line $x$—$y$ of Fig. 3.

Figs. 5 and 6 illustrate modified forms of the electrical conductors and their connections.

Figure 7 is a view similar to Figure 5 showing a modified construction of the U-shaped body.

Referring to the drawings, the top of a petrol tank of an automobile, or other fluid containing vessel is indicated generally at 1, and a float 2, which may be of cork, or other suitable construction adapted to float on the fluid, is disposed within the tank secured to the outer end of an arm 3. In Fig. 1, the parts are shown in the position occupied when the tank is half-full, whilst the positions of the float when the tank is full, and when it is empty, are indicated in dotted lines at $2^a$ and $2^b$ respectively. As the float rises or falls with the level of the liquid in the tank, it causes a body 4, to be fully described hereinafter, to perform a rotary motion around a horizontal axis. This body 4, in the form illustrated in Figs. 1 and 2, consists of a hollow annulus, preferably made of glass, and approximately half-filled with mercury 5, the space above said mercury being preferably evacuated or filled with an inert gas. The body 4 is disposed in an annular sealed casing $5^a$, having a tubular extension 6 on one side, said casing being rotatably mounted on a horizontal spindle 7, arranged in bearings 8, on the inner walls of a casing 9, the upper portion of which has a flange 10 for the purpose of mounting the device in an opening in the top of the tank 1. It is immaterial whether the casing 5 be fixed on the shaft 7, and the latter be rotatable in its bearings, or whether the shaft be fixed, and the casing be rotatable on the shaft. The body 4 is secured within the casing 5, preferably by means of packing material 11. The inner end of the arm 3 is secured to the outside of the casing 5, and a suitable slot or opening is provided in the casing 9, to permit of the passage therethrough and movement of the arm 3. The body 4 is provided with a constriction or choke 12, as shown in Fig. 1. A fine metal wire 13, preferably of platinum, the ends of which pass through the glass walls of the body 4 is disposed within said body and dips into the mercury 5. This wire forms part of an electrical circuit to be described, the connections being made at the two ends of the wire, preferably within the body 4, and in close proximity to the point where said ends protrude through the walls of the body. It follows that the resistance of the circuit will vary according to the length of the wire 13 which is immersed in the mercury. Each end of the wire 13 makes electrical contact with two leads, the leads $a$ and $b$ being connected to one end, and $c$ and $d$, to the other end of the wire 13. One lead from each end of the wire 13, (in Fig. 1, leads $a$ and $d$) is connected to a galvanometer or like electrical indicating and/or recording device 14, whilst the other pair of leads ($b$ and $c$) form a circuit containing a battery 15, or other source of electrical energy, and a resistance 16 preferably of the variable kind. The leads $a$, $b$, $c$, $d$, leave the casing 9 at its upper end, and the galvanometer 14 and the battery 15 may be arranged at any convenient point, and if desired, at a distance from the fluid containing vessel; for example, the galvanometer may be arranged on the dash-board of an automobile.

I will now describe the means by which the leads $a$, $b$, $c$, $d$, are connected to the ends of the wire 13. It is obvious that as the body 4 undergoes rotary movement, the leads must be connected to the wire 13, in such a manner that the connection is adapted to follow these movements, whilst brush or like connections cannot be used, owing to the danger of fire, particularly where the device is used in petrol tanks. This difficulty is preferably overcome in the following manner. The four leads $a$, $b$, $c$, $d$ are covered with insulating material in the usual manner, and are passed through a solid drawn metal tube 17, said tube being inserted in the casing 9, through a suitable opening in its cover 18. At a point approximately opposite the casing 5, the tube 17, containing the leads $a$, $b$, $c$, $d$, is flattened and bent into a spiral shape, as shown in Figs. 3 and 4. It follows that the inner end 19 of the spiral will be resilient in the manner of a spiral spring. The spiral is mounted on the tubular extension 6, of the casing 5, and the leads protruding from its inner end 19, pass into said tubular extension 6, where they are connected to the ends of the wire 13, care being taken to make a perfect electrical joint, which may be covered with any suitable material.

The galvanometer 14 is provided with a graduated scale to indicate the various levels of fluid in the vessel, and it may if desired be provided with a push-button connection 20, for making and breaking its circuit.

The operation of this form of the improved device is as follows:—

The float 2 will always float on the surface of the liquid, and as the level thereof rises or falls, the movement of the float will cause the sealed casing 5, and the annular body 4 contained therein, to perform a rotary motion in one direction or the other, whereby a greater or less length of the platinum wire 13 will be immersed in the mercury 5. The internal diameter of the mercury containing body 4 is of such a size as to cause the resistance of the column of mercury it contains to the current being used, to be practically nil. It follows therefore that the resistance of the platinum wire 13 to the current from the source 15, will vary according to the length of wire immersed in the mercury, which in turn will, vary with the depth of the liquid to be measured. The current flowing through the shunt or galvanometer circuit will also be proportional to the resistance of the wire 13, as it is obvious that when the whole of said wire is immersed in the mercury, the effect will be that of a dead short between the two ends of the wire 13, in which case no current will flow through the shunt circuit. In this way the current indicated on the galvanometer is always proportional to the depth of liquid to be measured. It is of course understood that the galvanometer will have to be calibrated and the various parts of the device assembled in accordance with the dimensions of the fluid containing vessel, and of the strength of the currents being used.

In the form illustrated in Figs. 1 and 2, the device is so assembled that when the fluid containing vessel is full, practically the whole of the wire 13 is immersed in the mercury, so that no current flows through the galvanometer, the zero point of which in this case, corresponds to the full position, whilst the maximum flow of current position corresponds with an empty vessel.

The invention of course is not limited in this respect, as this device, with the connections to the wire 13, and the markings on the galvanometer scale could also be made in the inverse way. The effect of the choke 12, is to steady the mercury when the device is subject to vibration or the like, as for example, when used in connection with an automobile. The press button 20, which may if desired, be of any convenient type, enabling it to be fixed in either the make or break position, enables the user to ascertain the depth of the petrol in his tank at any time without the unnecessary expenditure of current which would arise if the circuit were always complete.

It should be noted that the source of electrical power 15 may consist of either of one, or a plurality of electric cells or batteries, or if desired, any part of the ordinary electrical equipment used on automobiles, may be used for this purpose. Where however the current supplied from the source is of variable potential, due allowance for this fact must be made when taking readings. Where extreme accuracy is desired, a second adjustable resistance or rheostat and second galvanometer may be used for the purpose of adjusting the operating current to a predetermined strength, according to the calibration of the fluid level indicating galvanometer, before taking readings.

I will now describe several modifications falling within the scope of the invention.

Thus for example, the body 4 need not necessarily be of the shape shown in Figs. 1 and 2, but a U shaped body could also be employed. Furthermore, the shape of the wire 13, and of its connections may also be varied, and if desired, a single wire may be used instead of the double wire illustrated in Figs. 1 and 2. Two forms of such single wire are illustrated in Figs. 5 and 6. In the case of the single wire, the connections a, b, c, d, may either be attached to the wire in such a way that two connections are made at each end of said wire, (Fig. 6) or they may be arranged in various other ways. For example, one end of the wire may carry two connections a—b (Fig. 5) whilst the other end has one connection c, the fourth lead d being attached to the wire at a point adjacent to the choke 12, but other shapes of the body 4 and arrangements of the wire 13 and its connections may be used without departing from the scope of the invention.

It should be noted, that if desired, the distance from the top of the tank or fluid containing vessel to the pivoted point of the body 4, may be made adjustable, which permits of a standard instrument being used for various depths of tanks. This effect can be achieved in various ways. For example, the cylindrical casing 9 could be made telescopical in two parts, which could be held together in any desired position by means of bolts and nuts passing through slots. In this case, the solid drawn metal tube 17 would of course be coiled, or bent, in such a way as to accommodate for the particular length of cylinder being used.

The device is not limited to the use of petrol tanks only, but could be used in factories and in other places where it is desired to have an indication of the level of a liquid in a containing vessel. Furthermore, instead of the galvanometer described, any suitable or known form of recording device may be employed, without departing from the spirit of the invention.

I do not desire to be limited to the particular details of construction described and illustrated, as it will be apparent that these also can be varied within the scope of the invention.

I claim:—

1. In a liquid level indicating means a float-actuated rheostat, comprising a float, and a closed body having an annular passage filled with mercury and adapted to undergo rotary movement about its horizontal axis as the float rises or falls, and a conducting wire fixed within said passage the ends of which are connected to leads enclosed within a metal tubing mounted substantially coaxially with said body in a manner enabling said body to rotate without breaking the connection of a circuit of which said wires form part, the whole being so arranged that rotation of said body about its axis varies the resistance of the circuit by varying the length of wire immersed in said mercury.

2. A liquid level indicating means as claimed in claim 1, in which said annular passage comprises means for damping undue oscillations of said mercury.

3. A liquid level indicating means as claimed in claim 1, in which said metal tubing enclosing said leads is flexible.

4. A liquid level indicating means as claimed in claim 1, in which a constriction is formed in said annular passage for damping undue oscillations of said mercury.

5. A liquid level indicating means as claimed in claim 1, in which said leads are enclosed within a flexible metal tubing and a constriction is formed in said mercury containing annular passage to prevent undue oscillations of said mercury.

6. A liquid level indicating means as claimed in claim 1, in which said metal tube within which said leads are enclosed is flexible and is coiled round in a spiral, said spiral being mounted coaxially with said body, the ends of said wire being connected to said leads at the inner end of said spiral, thus enabling said body to rotate without breaking the electrical connections of said circuit.

7. In a liquid level indicating means, a float actuated rheostat comprising in combination a float, and a closed body, having an annular passage partially filled with mercury and adapted to undergo rotary movement about its horizontal axis as the float rises or falls, said annular passage possessing a constriction in the walls thereof for damping undue oscillation of said mercury, and a conducting wire, included within an electric circuit mounted within said annular passage, the ends of which are fixed to leads enclosed within a flexible metal tubing said tubing being coiled round to form a spiral, said spiral being mounted coaxially with said body, the ends of said conducting wire being connected to said leads at the inner end of said spiral, thus enabling said body to rotate without breaking the electrical connections of said circuit.

8. In a liquid level indicating means, a float actuated rheostat comprising a float, and a closed U-shaped hollow body partially filled with mercury disposed in two limbs thereof, and adapted to undergo rotary movement about its horizontal axis as the float rises or falls, and a conducting wire fixed within said body, the ends of which are connected to leads enclosed within a metal tubing mounted substantially coaxially with said body in a manner enabling said body to rotate without breaking the connection of a circuit of which said wire forms part, the whole being so arranged that rotation of said body about its axis varies the resistance of the circuit by varying the length of wire immersed in said mercury.

9. A liquid level indicating means as claimed in claim 8, in which said hollow body comprises means for damping undue oscillations of said mercury.

10. A liquid level indicating means as claimed in claim 8, in which said metal tubing enclosing said leads is flexible.

11. A liquid level indicating means as claimed in claim 8, in which a constriction is formed in said hollow body for damping undue oscillations of said mercury.

12. A liquid level indicating means as claimed in claim 8, in which said leads are enclosed within a flexible metal tubing and a constriction is formed in said mercury containing hollow body to prevent undue oscillations of said mercury.

13. A liquid level indicating means as claimed in claim 8, in which said metal tube within which said leads are enclosed is flexible, and is coiled round in a spiral said spiral being mounted coaxially with said body, the ends of said wire being connected to said leads at the inner ends of said spiral, thus enabling said body to rotate without breaking the electrical connections of said circuit.

14. In a liquid level indicating means, a float actuated rheostat comprising in combination a float, and a closed U-shaped hollow body partially filled with mercury disposed in the two limbs thereof, and adapted to undergo rotary movement about its horizontal axis as the float rises or falls, said hollow body possessing a constriction in the walls thereof for damping undue oscillations of said mercury, and a conducting wire included within an electric circuit fixed within said hollow body, the ends of which are fixed to leads enclosed within a flexible metal tubing, said tubing being coiled round to form a spiral, said spiral being mounted coaxially with said body, the ends of said conducting wire being connected to said leads at the inner end of said spiral, thus enabling said body to rotate without breaking the electrical connections of said circuit.

In witness whereof I affix my signature.

CHARLES HYLAND.